H. C. FRIPP.
ATTACHMENT FOR CONNECTING THE FRAME AND AXLE OF AN AUTOMOBILE.
APPLICATION FILED DEC. 15, 1915.
1,204,001. Patented Nov. 7, 1916.
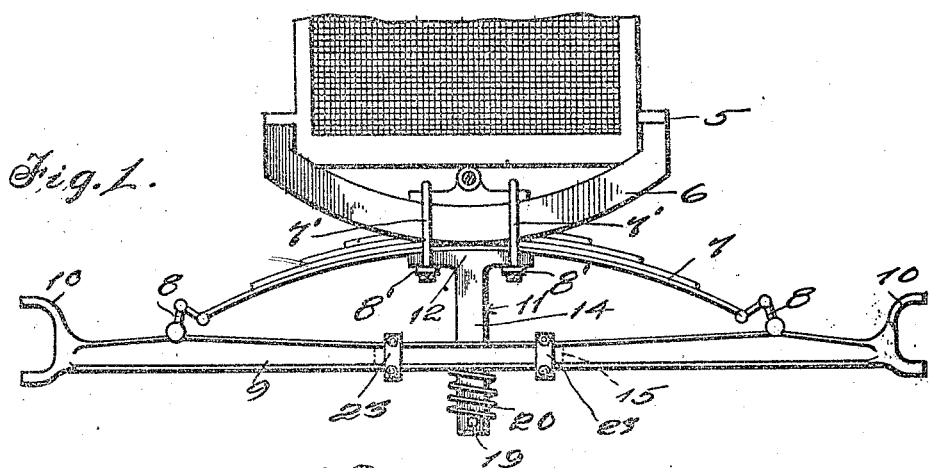
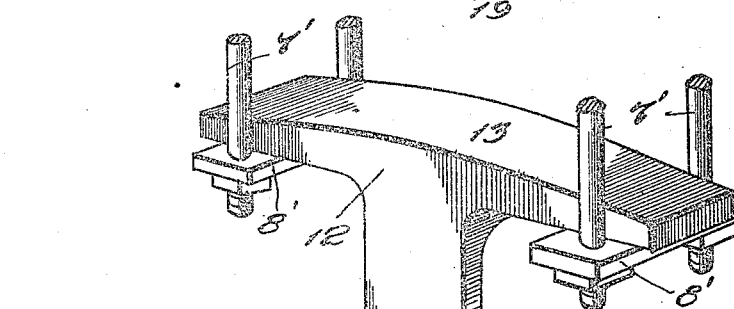

UNITED STATES PATENT OFFICE.

HAROLD C. FRIPP, OF WALTERBORO, SOUTH CAROLINA.

ATTACHMENT FOR CONNECTING THE FRAME AND AXLE OF AN AUTOMOBILE.

1,204,001.

Specification of Letters Patent.

Patented Nov. 7, 1916.

Application filed December 15, 1915. Serial No. 67,029.

*To all whom it may concern:*

Be it known that I, HAROLD C. FRIPP, a citizen of the United States, residing at Walterboro, in the county of Colleton and State of South Carolina, have invented certain new and useful Improvements in Attachments for Connecting the Frame and Axle of an Automobile, of which the following is a specification.

My invention relates to improvements in attachments for connecting the forward end of the chassis or frame of an automobile, such as a Ford automobile, or a motor vehicle of similar construction, with the front axle.

The device embodying my invention has for its object the provision of means for preventing or destroying lateral swinging motions of the chassis or frame of the automobile with respect to the front axle; strengthening, supporting and reinforcing the front leaf spring of the vehicle at or near its center; and holding the front axle firmly in its normal position against turning movement upon its longitudinal axis, thus relieving the strain upon the radius rods or the like.

Other objects and advantages of the invention will be apparent during the course of the following description.

In the accompanying drawings forming a part of this specification and in which like numerals are employed to designate like parts throughout the same, Figure 1 is a side elevation of an attachment embodying the invention, showing the same in use, and, Fig. 2 is a rear perspective view of the same, removed.

In the drawings, wherein for the purpose of illustration is shown a preferred embodiment of my invention, the numeral 5 designates the chassis or frame of a Ford automobile, having a front cross-member 6 rigidly attached to its forward end. Arranged within and beneath the cross member 6 is a front leaf spring 7, the lower ends of which are pivotally connected with spring perches 8, rigidly attached to a front axle 9. U-bolts 7' pass through apertured plates 8' and serve to bind the cross-member 6 and spring 7 together, as is customary. The front axle is provided at its ends with vertical forks 10, for receiving the pivots for knuckles of the front wheels. The foregoing description is that of the ordinary Ford automobile and no further detailed description is thought to be necessary.

My attachment comprises a substantially T-shaped member 11, comprising an approximately horizontal or transverse head 12, which is preferably rigid and has its upper surface 13 longitudinally curved, for conforming to or contacting with the lower curved surface of the front spring 7, as shown. Depending from the approximately horizontal head 12 is an approximately vertical or upstanding shank 14, rigidly connected and preferably formed integral therewith. The same U-bolts 7' and plates 8' are employed for holding the horizontal or transverse head 12 to the front leaf spring. The attachment further comprises a bar or socket 15, having an enlarged central portion 16, provided with a vertical opening 17 within which the shank or bar 14 is adapted to freely reciprocate, but cannot swing perceptibly with relation thereto. The lower end of the bar or shank 11 is provided with a transverse opening, receiving a pin 19, and a coil spring 20 is interposed between this pin and the bar or shank 15 and serves to take up rebound shocks. The bar or socket 15 is preferably provided near its ends with ribs or lugs 21', receiving the transverse portion of U-bolts 22. The ends of these U-bolts extend through apertures in plates 23. The bar or socket 15 is arranged upon the rear side of the front axle 9 and the plates 23 are disposed upon the front side of this axle, as shown.

When the appliance is attached to the front spring 7 and the front axle 9, as above indicated, it will prevent undue lateral swinging movement of the chassis or frame of the automobile with relation to the front axle. The approximately horizontal or transverse head 12 reinforces the front leaf spring 7 at its center and is bound thereto by the U-bolts 7', without any additional attaching means. The shank 11 operating within the opening 17 in the socket 15 permits of the free operation of both arms of the front spring 7, while firmly holding the front axle against turning movement upon its longitudinal axis, thus retaining the knuckles or pivot elements of the front wheels in vertical alinement. The attachment also takes undue strains off of the radius rods and associated elements. The spring 20 serves to take up rebound shocks.

It is obvious that I have provided an appliance of the above mentioned character, which is extremely simple in construction, convenient in use, and may be installed upon a Ford automobile without in any way altering its construction.

While I have shown and described my attachment as applied to a Ford automobile, it is understood that the invention is in no sense restricted to this application, as it may be advantageously used in connection with a number of automobiles of more or less similar construction.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described the invention, I claim:

An attachment of the character described, comprising an approximately T-shaped member including a transverse head to be arranged beneath and adjacent the lower surface of the front leaf spring of an automobile, and a shank rigidly secured to and depending from the head, U-bolts serving to bind the head to the leaf spring and the leaf spring to the frame of the vehicle, a socket member arranged upon one side of the front axle and having an opening to receive the shank, and means to secure the socket member to the front axle.

In testimony whereof I affix my signature in presence of two witnesses.

HAROLD C. FRIPP.

Witnesses:
 WM. I. FISHBURNE,
 E. L. FISHBURNE.